United States Patent
D'Amato et al.

(10) Patent No.: US 9,200,130 B2
(45) Date of Patent: Dec. 1, 2015

(54) METHOD FOR OBTAINING WAX FROM RECYCLED POLYETHYLENE

(75) Inventors: Michael J. D'Amato, Thornhill (CA); Santiago Faucher, Oakville (CA); Timothy L. Lincoln, Rochester, NY (US); Ali Darabi, Kingston (CA); Rosa Duque, Brampton (CA)

(73) Assignee: XEROX CORPORATION, Norwalk, CT (US)

(*) Notice: Subject to any disclaimer, the term of this patent is extended or adjusted under 35 U.S.C. 154(b) by 260 days.

(21) Appl. No.: 13/569,036

(22) Filed: Aug. 7, 2012

(65) Prior Publication Data
US 2014/0046102 A1     Feb. 13, 2014

(51) Int. Cl.
| | |
|---|---|
| C10G 1/10 | (2006.01) |
| C10G 1/00 | (2006.01) |
| C10G 1/02 | (2006.01) |
| C08J 11/00 | (2006.01) |
| C08L 91/06 | (2006.01) |
| C08L 91/08 | (2006.01) |

(52) U.S. Cl.
CPC ............... *C08J 11/00* (2013.01); *C08L 91/06* (2013.01); *C08L 91/08* (2013.01); *C10G 1/10* (2013.01); *C08L 2201/56* (2013.01); *C08L 2205/24* (2013.01)

(58) Field of Classification Search
CPC ..... C10G 1/00; C10G 1/10; C10G 2300/1007
USPC .................................................. 585/17, 241
See application file for complete search history.

(56) References Cited

U.S. PATENT DOCUMENTS

| 4,394,473 A * | 7/1983 | Winter et al. ................. 524/226 |
| 6,822,126 B2 * | 11/2004 | Miller ............................ 585/241 |
| 2011/0214979 A1 * | 9/2011 | Chen et al. .................... 202/238 |
| 2012/0016169 A1 * | 1/2012 | Kumar .......................... 585/241 |

FOREIGN PATENT DOCUMENTS

| EP | 2 407 528 A1 | 1/2012 |
| WO | WO 2012/007833 A2 | 1/2012 |

OTHER PUBLICATIONS

Lepoutre, 2008, The manufacture of polyethylene, 2008, New Zealand Institute of Chemistry.*

* cited by examiner

*Primary Examiner* — In Suk Bullock
*Assistant Examiner* — Youngsul Jeong
(74) *Attorney, Agent, or Firm* — Pillsbury Winthrop Shaw Pittman LLP

(57) ABSTRACT

An economical and environmentally friendly method for producing waxes. In particular, the methods use thermolytic degradation concurrently with a distillation process to obtaining distilled waxes from recycled polyethylene. The resulting waxes have desirable properties, such as reduced molecular weight and narrow polydispersity, that makes the waxes useful in various applications.

17 Claims, 1 Drawing Sheet

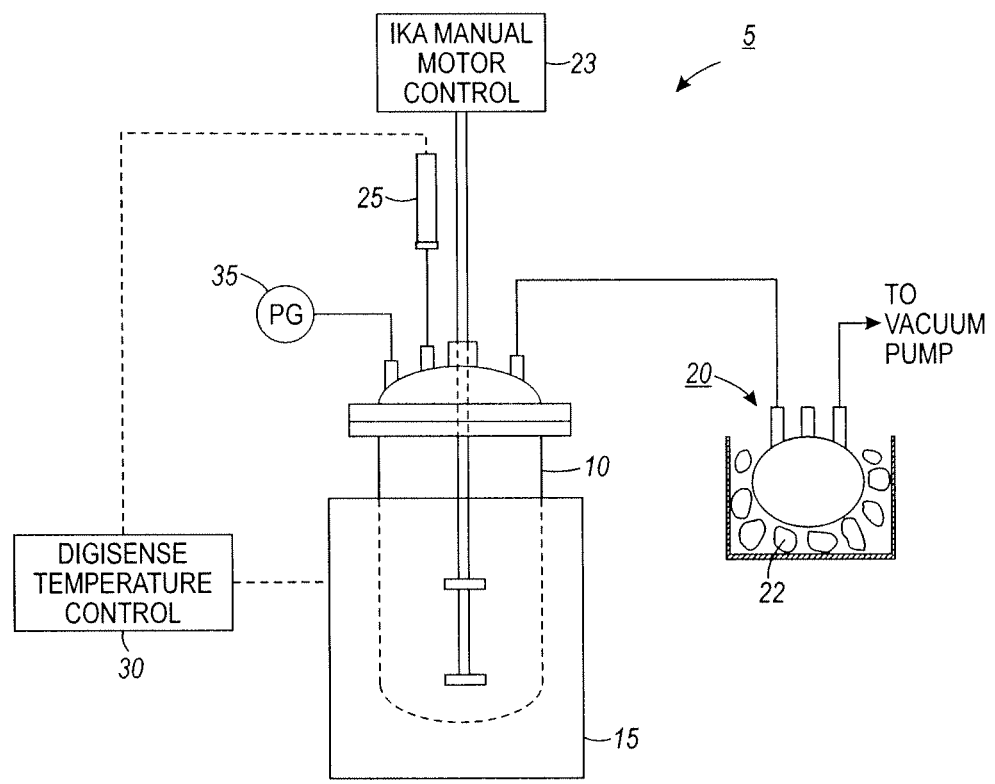

METHOD FOR OBTAINING WAX FROM RECYCLED POLYETHYLENE

BACKGROUND

The present embodiments relate to an economical and environmentally friendly method for obtaining distilled waxes from recycled polyethylene.

Wax is used in large quantities for various manufacturing processes, and represents a large cost of supplies for companies using such processes. For example, in the printing industry, wax is a critical component which represents a substantial portion of both toners and inks. Moreover, in many of these processes, the wax used is expensive distilled wax. Distilled waxes are expensive because the raw material feeding the distillation process is scarce and a great deal of the wax feed is wasted in the distillation process.

Thermal degradation of high molecular weight polyethylene has been ongoing for decades. The primary goal of previous work, occurring mainly in academia, was an attempt to elucidate degradation mechanisms and generate materials which were primarily very low molecular weight hydrocarbon fuels. There has been very little concerted effort in the area of degrading polyethylene (PE) so as to obtain a PE-wax suitable as a raw material for other processes.

Most if not all methods for producing PE-waxes from high molecular weight PE feed stocks include thermal degradation through pyrolysis. However, these methods are not suitable for producing high quality waxes for certain applications, such as making toners or inks because they only perform a degradation step. Since the amount of degradation is difficult to control, the resulting material has a wide molecular weight distribution resulting in a material with a broad melting range which is undesirable. The distillation step is necessary for producing a narrow molecular weight distribution which in turn results in a material with a sharp melting point.

Thus, a new route for the production of distilled wax that can be used as a raw material for other processes and that is efficient and cost effective, for example, uses less expensive feedstocks, is highly desirable.

SUMMARY

According to the embodiments illustrated herein, there is provided a process for producing a wax from recycled polyethylene, comprising: providing an amount of recycled polyethylene; heating the recycled polyethylene to a high temperature to undergo de-polymerization; degrading the recycled polyethylene to smaller wax fragments; concurrently distilling the recycled polyethylene during the degradation to collect and remove the smaller wax fragments. In specific embodiments, the methods obtain distilled waxes from recycled high molecular weight polyethylene to produce waxes similar in nature and structure to polyethylene waxes, polymethylene waxes, paraffin waxes and Fischer-Tropsch waxes.

In particular, the present embodiments provide a process for producing a wax from recycled polyethylene, comprising: providing an amount of recycled polyethylene, wherein the recycled polyethylene has the following general structure

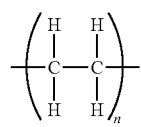

wherein n represents the repeating units and further wherein the provided polyethylene has n from about 250 to about 3000; heating the recycled polyethylene to a high temperature to undergo de-polymerization; degrading the recycled polyethylene to smaller polyethylene fragments; concurrently distilling the recycled polyethylene during the degradation to collect and remove the smaller polyethylene fragments, wherein the recycled polyethylene is converted to the smaller polyethylene fragments having n from about 15 to about 100.

In further embodiments, there is provided a process for producing a wax from recycled polyethylene, comprising: providing an amount of polyethylene; heating the polyethylene to a high temperature under vacuum to undergo de-polymerization; stirring the polyethylene during the heating step to degrade the polyethylene to smaller polyethylene fragments; concurrently distilling the polyethylene during the degradation to collect and remove the smaller polyethylene fragments.

BRIEF DESCRIPTION OF THE DRAWINGS

For a better understanding of the present embodiments, reference may be had to the accompanying FIGURE.

The FIGURE is an illustration of equipment setup used to obtain distilled wax from recycled polyethylene according to the present embodiments.

DETAILED DESCRIPTION

In the following description, it is understood that other embodiments may be utilized and structural and operational changes may be made without departure from the scope of the present embodiments disclosed herein. The present embodiments relate to an economical and environmentally friendly method for producing waxes.

In particular, the embodiments illustrated herein provide a process for producing a wax from recycled high molecular weight polyethylene. The polyethelene which can be either high density (HDPE) or linear low density (LLDPE) polyethylene undergoes a de-polymerization under high temperature creating smaller fragments similar in structure to the original molecule. The material is concurrently distilled under vacuum to capture the smaller fragments. The waxes produced by this method are similar in nature and structure to polyethylene waxes, polymethylene waxes, paraffin waxes and Fischer-Tropsch waxes.

Described herein is a reactive distillation process that produces narrowly distributed waxes from recycled polyethylene. In embodiments, recycled high density polyethylene (HDPE) and/or linear low density polyethylene (LLDPE) are heated to approximately a high temperature at which the polyethylene undergoes a de-polymerization. For example, the temperature is heated to from about 200 to about 500° C., or from about 250 to about 450° C., or from about 350 to about 425° C. In a specific embodiment, the polyethylene is heated to a temperature of 400° C. to undergo de-polymerization. In further embodiments, the polyethylene is heated under vacuum and stirred. In such embodiments, the vacuum is set at a pressure of from about 1 to about 760 mmHg, or from about 1 to about 100 mmHg, or from about 1 to about 10 mmHg. The polyethylene may be mixed at a speed of from about 100 to about 200 RPM, or from about 125 to about 175 RPM, or from about 140 to about 160 RPM.

In this manner, the original polyethylene, having a high weight average molecular weight (Mw) can be broken down into small polyethylene fragments having lower molecular weights. For example, the original polyethylene may have a molecular weight (Mw) of from about 10,000 to about 100,000, or from about 20,000 to about 80,000, or from about 30,000 to about 60,000. In specific embodiments, the original polyethylene has a molecular weight in the range of about 50,000. The smaller polyethylene fragments have molecular weights in the range of from about 200 to about 2000, or from about 300 to about 1000, or from about 500 to about 750.

Concurrently with the heating process, a distillation is undertaken so that the small polymer fragments (or waxes) that are produced are distilled off and removed from the degradation reactor. Thus, the molecular weight of polyethylene is reduced by thermolytic degradation while distilling off the products of degradation to produce narrowly distributed wax cuts. By degrading the polyethylene concurrently with a distillation, the entire mass of polyethylene is converted to the desired wax fraction—providing a very efficient manner in which to process the recycled polyethylene with very little waste. For example, from about 50 to about 100 percent or from about 60 to about 80 percent of the starting recycled polyethylene is converted to the desired wax. The combination of the thermolytic degradation and distillation provides the full conversion of the waste stock into the wax having the desired specific properties, and the recovery of such wax.

The small polyethylene fragments produced have both low molecular weight and narrow polydispersity (PD). In embodiments, the small polyethylene fragments have a polydispersity of from about 1.0 to about 2.0, or from about 1.1 to about 1.5, or from about 1.2 to about 1.3. The process can yield such small polyethylene fragments from recycled high molecular weight polyethylene having both high and low density. For example, in embodiments, the starting polyethylene that is provided may have a polydispersity of from about 2.0 to about 6.0, or from about 3.0 to about 5.0, or from about 3.5 to about 4.5. In this manner, the production of the narrowly distributed wax from the entire feedstock can be collected and used in pure form. Although the distillation adds steps and expenses to the overall process, the results provide an end product that makes the overall process economical. Such a distillation process, in contrast to the current technology, allows for the use of a cheap recycled material as feedstock to produce a desired product. The present embodiments can be used in batch or continuous modes.

As mentioned above, the present embodiments uses thermolytic degradation to break down polyethylene. The polymer is exposed to high temperatures which causes the carbon-carbon chemical bonds of the original molecule to break resulting is small fragments. Because polyethylene has a highly aliphatic structure, the resulting fragments are likewise aliphatic in nature.

The structure below shows the repeating unit of polyethylene where n is the number of repeating units.

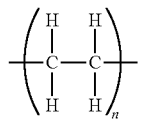

The starting material being used has a n value of from about 500 to about 3500, or from about 1000 to about 2000, or of from about 1500 to about 1750. In specific embodiments, the starting material has a n value of approximately 1750 which corresponds to a molecular weight of approximately 50,000. Through thermolytic degradation, the number of repeating units is reduced to a range between 10 and 25 which corresponds to a molecular weight of approximately 300-700. In this form, the polyethylene can be used in various applications. For example, polyethylene wax produced by this process has potentially useful applications in inks and toners.

The thermolytic degradation and distillation can be carried out, in embodiments, with a laboratory setup shown in the FIGURE. As seen, the laboratory setup 5 includes a glass container with mixer 10 to hold the wax or polyethylene, a heating device 15 to heat the glass container, a distillate collection 20, and vacuum pump (not shown). In embodiments, dry ice 22 may be used to help the distillation process. In specific embodiments, the system 5 may also include a manual motor control 23. The heating device used may comprise a heating mantle with feedback control from a Type K thermocouple 25 and the glass container 10 is a glass resin kettle mixer and a temperature control 30. In embodiments, the system can achieve a vacuum level of from about 10 to about 15 mmHg absolute. The system may include a pressure gauge 35 to indicate and control the system vacuum.

It will be appreciated that many of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Using a laboratory setup that included a heating mantle with feedback control from a Type K thermocouple, a glass resin kettle with mixer, a distillate collection and a vacuum pump, about 200 grams of linear low density polyethylene (Mw =50000, PD =3.4) was processed according to the present embodiments. The polyethylene was heated to about 400° C. under 10 mmHg vacuum while mixing at 150 RPM.

In Example 1, the polyethylene was heated to 380° C. The polyethylene was degraded and collected as distillates after 1.5 hours.

Example 2

The same laboratory setup used in Example 1 was used in Example 2 except that the polyethylene was heated to 415° C., and the polyethylene was degraded and collected as distillates after 3.5 hours.

Example 3

The same laboratory setup used in Example 1 was used in Example 3 except that the polyethylene was heated to 415° C. the polyethylene was degraded and collected as distillates after 1.5 hours.

Results

The collected materials from the above examples were in the 500 Mw range and had fairly low polydispersity (approx. 1.2), see Table 1.

TABLE 1

Reactive Distillation Conditions and Distillate Properties

| Sample | Time (hr) | Temp (° C.) | Mn | Mw | PD |
|---|---|---|---|---|---|
| 1 | 1.5 | 380 | 300 | 377 | 1.26 |
| 2 | 3.5 | 415 | 364 | 441 | 1.21 |
| 3 | 1.5 | 415 | 463 | 583 | 1.26 |

SUMMARY

In summary, the present embodiments provide a process for producing narrowly distributed wax produced from waste polyethylene via reactive-distillation. The process facilitates low cost sourcing of waxes from waste. Such waxes are widely used in various applications, such as for example, the manufacture of inks and toners. The present embodiments allows for less reliance on the current supply model which is both expensive and not environmentally friendly.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A process for producing a wax from recycled polyethylene, comprising:
   providing an amount of recycled polyethylene;
   heating the recycled polyethylene to a high temperature of from about 200 °C. to about 500 °C. and under a pressure of from about 1 mmHg absolute to about 100 mmHg absolute to undergo de-polymerization;
   degrading the recycled polyethylene to smaller wax fragments having a molecular weight of from about 200 to about 2,000;
   concurrently distilling the recycled polyethylene under a pressure of from about 1 mmHg absolute to about 100 mmHg absolute during the de-polymerization to collect and remove the smaller wax fragments.

2. The process of claim 1, wherein the recycled polyethylene is selected from the group consisting of high density polyethylene, linear low density polyethylene, and mixtures thereof.

3. The process of claim 1, wherein the recycled polyethylene is heated to a high temperature of from about 200 to about 500° C.

4. The process of claim 3, wherein the recycled polyethylene is heated to a high temperature of from about 250 to about 450° C.

5. The process of claim 4, wherein the recycled polyethylene is heated to a high temperature of from about 350 to about 425° C.

6. The process of claim 1, wherein the recycled polyethylene has a number average molecular weight of from about 10,000 to about 100,000.

7. The process of claim 6, wherein the recycled polyethylene has a number average molecular weight of from about 30,000 to about 60,000.

8. The process of claim 1, wherein the recycled polyethylene has a polydispersity of from about 1.0 to about 2.0.

9. The process of claim 1, wherein the smaller wax fragments have a molecular weight of from about 300 to about 1000.

10. The process of claim 1, wherein the smaller wax fragments have a polydispersity of from about 1.01 to about 1.5.

11. The process of claim 1, wherein from about 60 to about 80 percent of the recycled wax is converted to the smaller wax fragments.

12. A process for producing a wax from recycled polyethylene, comprising:
    providing an amount of recycled polyethylene, wherein the recycled polyethylene has the following general structure

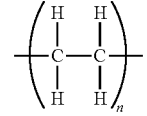

wherein n represents repeating units and further wherein the recycled polyethylene has n from about 250 to about 3500;
   heating the recycled polyethylene to a high temperature of from about 200 °C. to about 500 °C. and under a pressure of from about 1 mmHg absolute to about 100 mmHg absolute to undergo de-polymerization;
   degrading the recycled polyethylene to smaller polyethylene fragments;
   concurrently distilling the recycled polyethylene under a pressure of from about 1 mmHg absolute to about 100 mmHg absolute during the de-polymerization to collect and remove the smaller polyethylene fragments, wherein the recycled polyethylene is converted to the smaller polyethylene fragments having n from about 15 to about 100 in the general structure.

13. A process for producing a wax from polyethylene, comprising:
    providing an amount of polyethylene;
    heating the polyethylene to a high temperature of from about 200 °C. to about 500 °C. under a pressure of from about 1 mmHg absolute to about 100 mmHg absolute with a vacuum pump to undergo de-polymerization;
    stirring the polyethylene during the heating step to degrade the polyethylene to smaller polyethylene fragments having a molecular weight of from about 200 to about 2,000;
    concurrently distilling the polyethylene under a pressure of from about 1 mmHg absolute to about 100 mmHg absolute with the vacuum pump during the de-polymerization to collect and remove the smaller polyethylene fragments.

14. The process of claim 13, wherein the polyethylene is stirred at a speed of from about 100 to about 200 RPM.

15. The process of claim 14, wherein the polyethylene is stirred at a speed of from about 125 to about 175 RPM.

16. The process of claim 13, wherein the polyethylene is heated under a pressure of from about 1 mmHg absolute to about 100 mmHg absolute.

17. The process of claim 16, wherein the polyethylene is heated under a pressure of from about 1 mmHg absolute to about 100 mmHg absolute.

* * * * *